US009576371B2

(12) United States Patent
Mongeon et al.

(10) Patent No.: US 9,576,371 B2
(45) Date of Patent: Feb. 21, 2017

(54) BUSYNESS DEFECTION AND NOTIFICATION METHOD AND SYSTEM

(71) Applicant: Xerox Corporation, Norwalk, CT (US)

(72) Inventors: Michael C. Mongeon, Walworth, NY (US); Robert Paul Loce, Webster, NY (US); Matthew Adam Shreve, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 11 days.

(21) Appl. No.: 14/625,960

(22) Filed: Feb. 19, 2015

(65) Prior Publication Data

US 2015/0310312 A1  Oct. 29, 2015

Related U.S. Application Data

(60) Provisional application No. 61/984,239, filed on Apr. 25, 2014.

(51) Int. Cl.
   *G06K 9/00* (2006.01)
   *H04N 7/18* (2006.01)
   *G06F 3/00* (2006.01)
   *G06T 7/00* (2006.01)
   *G06T 7/20* (2006.01)

(52) U.S. Cl.
   CPC ......... *G06T 7/0081* (2013.01); *G06K 9/00778* (2013.01); *G06T 7/2053* (2013.01); *G06T 2207/10024* (2013.01); *G06T 2207/20021* (2013.01); *G06T 2207/20072* (2013.01); *G06T 2207/20076* (2013.01); *G06T 2207/20081* (2013.01); *G06T 2207/20144* (2013.01); *G06T 2207/30196* (2013.01); *G06T 2207/30232* (2013.01); *G06T 2207/30242* (2013.01)

(58) Field of Classification Search
   CPC ...... G06K 9/6256; G06K 9/66; G06K 9/6217; G06K 9/6282; G06K 9/00778; G06F 17/30256; G06T 7/6081; G06T 7/2053; G06T 2207/20076; G06T 2207/20072; G06T 2207/30242; G06T 2207/20144; G06T 2207/30232; G06T 2207/30196
   USPC ....... 382/103, 100, 159, 224, 181, 250, 232, 382/248, 190, 199, 195, 276, 293, 298, 382/299, 300; 709/203, 201, 219, 217, 382/223, 225; 345/518, 545, 530, 546, 345/555, 418, 428; 715/201, 200, 203, 715/221, 716, 723; 348/61, 143
   See application file for complete search history.

(56) References Cited

U.S. PATENT DOCUMENTS

| | | | |
|---|---|---|---|
| 5,465,115 A | 11/1995 | Conrad et al. | |
| 5,581,625 A | 12/1996 | Connell | |
| 5,953,055 A | 9/1999 | Huang et al. | |
| 6,195,121 B1 | 2/2001 | Huang et al. | |

(Continued)

OTHER PUBLICATIONS

U.S. Appl. No. 13/975,245, filed Aug. 23, 2013, Gross et al.

(Continued)

*Primary Examiner* — Sheela C Chawan
(74) *Attorney, Agent, or Firm* — Fay Sharpe LLP

(57) ABSTRACT

This disclosure provides a video-based method and system for busyness detection and notification. Specifically, according to an exemplary embodiment, multiple overhead image capturing devices are used to acquire video including multiple non-overlapping ROIs (regions of interest) and the video is processed to count the number of people included within the ROIs. A busyness metric is calculated based on the number of people counted and notification of the busyness metric or changes in the busyness metric is communicated to appropriate personnel, e.g., a manager of a retail store.

18 Claims, 11 Drawing Sheets

(56) References Cited

U.S. PATENT DOCUMENTS

| | | | |
|---|---|---|---|
| 6,654,047 B2 | 11/2003 | Iizaka | |
| 7,076,102 B2* | 7/2006 | Lin et al. | G06K 9/00335 348/E7.086 |
| 7,187,786 B2* | 3/2007 | Kee | G07C 9/00158 382/118 |
| 7,310,442 B2* | 12/2007 | Monachino | G06K 9/6293 348/169 |
| 7,386,151 B1* | 6/2008 | Moritz | G06K 9/00771 340/5.52 |
| 7,522,772 B2* | 4/2009 | Porter | G06K 9/00228 382/103 |
| 7,606,425 B2* | 10/2009 | Bazakos | G06K 9/00335 348/143 |
| 7,688,349 B2 | 3/2010 | Flickner et al. | |
| 8,401,230 B2 | 3/2013 | Kozitsky et al. | |
| 8,532,336 B2* | 9/2013 | Bobbitt | G06K 9/00771 348/143 |
| 8,675,074 B2* | 3/2014 | Salgar | H04N 7/181 348/143 |
| 2008/0198225 A1* | 8/2008 | Gal | G08B 13/19606 348/143 |
| 2009/0217315 A1* | 8/2009 | Malik | G06K 9/00362 725/9 |
| 2012/0020518 A1* | 1/2012 | Taguchi | G06T 7/2093 382/103 |
| 2013/0265419 A1 | 10/2013 | Bulan et al. | |
| 2014/0063256 A1 | 3/2014 | Mongeon et al. | |
| 2014/0063263 A1 | 3/2014 | Bernal et al. | |
| 2014/0064566 A1 | 3/2014 | Shreve et al. | |

OTHER PUBLICATIONS

U.S. Appl. No. 14/022,488, filed Sep. 10, 2013, Loce et al.
U.S. Appl. No. 14/260,915, filed Apr. 24, 2014, Burry et al.
U.S. Appl. No. 14/261,013, filed Apr. 24, 2014, Bernal et al.
Agent Vi, "Video Analytics Applications for the Retail Market", created Jan. 23, 2012, http://www.agentvi.com/images/Agent_Vi_-_$_{Retail\_}$Applications.pdf.
Bay et al., "SURF: Speeded Up Robust Features", Computer Vision and Image Understanding, V. 110.3, 2008, p. 346-359.
Comaniciu et al., "Real-Time Tracking of Non-Rigid Objects Using Mean Shift", Proceedings of IEEE Conference on Computer Vision and Pattern Recognition, 2000, p. 142-149.
Dalal et al., "Histograms of Oriented Gradients for Human Detection", 2005.
Dickmanns et al., "Dynamic Monocular Machine Vision", Machine Vision and Applications, 1988, p. 223-240.
Forssen et al., "Shape Descriptors for Maximally Stable Extremal Regions", Proceedings of IEEE Conference on Computer Vision and Pattern Recognition, 2007.
Gustafsson et al., "Particle Filters for Positioning, Navigation and Tracking", IEEE Transactions on Signal Processing, 2002.
Harris et al., "A Combined Corner and Edge Detector", Alvey Vision Conference, vol. 15, 1988, p. 147-152.
Honeywell Security, "Intelligent Video Analytics for: The Retail Applications Market", Sep. 2007, http://www.security.honeywell.com/uk/video/documents/VideoAnalytics_Retail_UK.pdf.
Horn et al., "Determining Optical Flow", Artificial Intelligence 17, 1981, p. 185-203.
Huang et al., "Survey on Block Matching Motion Estimation Algorithms and Architectures With New Results", Journal of VLSI Signal Processing Systems 42, 2006, p. 297-320.
Kass et al., "Snakes: Active Contour Models", International Journal of Computer Vision, 1988, p. 321-331.
Ke et al., "PCA-SIFT: A More Distinctive Representation for Local Image Descriptors", Proceedings of IEEE Conference on Computer Vision and Pattern Recognition, 2004.
Lo et al., "Automatic Congestion Detection System for Underground Platforms", Proceedings of 2001 International Symposium on Intelligent Multimedia, Video and Speech Processing, May 2-4, 2001, p. 158-161.
Lowe, "Distinctive Image Features From Scale-Invariant Keypoints", 2004, p. 91-110.
Makarov, et al., "Intrusion Detection Using Extraction of Moving Edges", $12^{th}$ IAPR Int'l Conf. on Pattern Recognition, V.1, 1994, p. 804-807.
Oliver et al., "A Bayesian Computer Vision System for Modeling Human Interactions", IEEE Transactions on Pattern Analysis and Machine Intelligence, vol. 22, No. 8, Aug. 2000, p. 831-843.
Pillar, Real Value in Video Analytics, Integrated Solutions for Retailers, Jul. 26, 2010, http://www.retailsolutionsonline.com/doc/real-value-in-video-analytics-0001.
Retail Touch Points, "Video Analytics Solutions Help Retailers Optimize Customer Service and Workforce management", Dec. 9, 2011, http://www.retailtouchpoints.com/retail-store-ops/1230--video-analytics-solutions-help-retailers-optimize-customer-service-and-workforce-management-.
Rosten et al., "Machine Learning for High-Speed Corner Detection", Computer Vision ECCV 2006, p. 430-443.
Schmitt, "Checking in on "Minority Report" Video Analytics and Hyper-Targeting in Retail", Retail Touch Points, Feb. 3, 2011, http://www.retailtouchpoints.com/in-store-insights/714-checking-in-on-minority-report-video-analytics-and-hyper-targeting-in-retail.
SCOPIX Solutions, "Retail Video Analytics", http://www.scopixsolutions.com/solutions/.
Senior et al., "Video Analytics for Retail", 2007, http://rogerioferis.com/publications/FerisAVSS07b.pdf.
Stauffer et al., "Adaptive Background Mixture Models for Real-Time Tracking", Proceedings of the 1999 Conference on Computer vision and Pattern Recognition, 1999, p. 2246-2252.
Tomasi et al., "Detection and Tracking of Point Features", Technical Report CMU-CC-91-132, Carnegie Mellon University, School of Computer Science, 1991.
Zhu et al., "Face Detection, Pose Estimation, and Landmark Localization in the Wild", Proceedings of IEEE Conference on Computer Vision and Pattern Recognition, 2012.

* cited by examiner

BUSYNESS DEFECTION AND NOTIFICATION METHOD AND SYSTEM

CROSS REFERENCE TO RELATED PATENTS AND APPLICATIONS

This application claims priority to U.S. Provisional Application No. 61/984,239, filed on Apr. 25, 2014, by Mongeon et al. and entitled "BUSYNESS DETECTION AND NOTIFICATION METHOD AND SYSTEM", and is incorporated herein by reference in its entirety.

BACKGROUND

Modern retail processes are becoming heavily data driven, and retailers therefore have a strong interest in numerous customer and store metrics such as queue lengths, experience time in-store and drive-through, specific order timing, order accuracy, and customer response. Measurement of customer volume in the retail space using surveillance cameras is currently unavailable or lacking in versatility. As a store or public space gets busy or there is an anomalous volume or flow of pedestrian traffic, the queue lengths will grow, customer wait times will increase, or other inefficiencies and problems will arise. The store or space manager should react to the anomalous person volume, and hence will need to be notified of the problem. Some potential reactions include repositioning employees, adding a cashier, increasing security, or some other remedy.

What is needed is a way of providing a manager with an automated indication of store and/or space busyness.

INCORPORATION BY REFERENCE

U.S. application Ser. No. 13/975,245, filed Aug. 23, 2013, by Gross et al. and entitled "SYSTEM AND METHOD FOR AUTOMATED SEQUENCING OF VEHICLE UNDER LOW SPEED CONDITIONS FROM VIDEO";

U.S. application Ser. No. 14/022,488, filed Sep. 9, 2013, by Loce et al. and entitled "DETERMINING SOURCE LANE OF MOVING ITEM MERGING INTO DESTINATION LANE";

U.S. application Ser. No. 14/260,915, filed Apr. 24, 2014, by Burry et al. and entitled "VIDEO TRACKING BASED METHOD FOR AUTOMATIC SEQUENCING OF VEHICLES IN DRIVE-THRU APPLICATIONS";

U.S. application Ser. No. 14/261,013, filed Apr. 24, 2014, by Bernal et al. and entitled "SYSTEM AND METHOD FOR VIDEO-BASED DETERMINATION OF QUEUE CONFIGURATION PARAMETERS";

U.S. Pat. No. 5,465,115, granted Nov. 7, 1995, to Conrad et al. and entitled "VIDEO TRAFFIC MONITOR FOR RETAIL ESTABLISHMENTS AND THE LIKE";

U.S. Pat. No. 5,581,625, granted Dec. 3, 1996, to Connell and entitled "STEREO VISION SYSTEM FOR COUNTING ITEMS IN A QUEUE";

U.S. Pat. No. 5,953,055, granted Jun. 14, 1999, to Huang et al. and entitled "SYSTEM AND METHOD FOR DETECTING AND ANALYZING A QUEUE";

U.S. Pat. No. 6,195,121, granted Feb. 27, 2001, to Huang et al. and entitled "SYSTEM AND METHOD FOR DETECTING AN ANALYZING A QUEUE";

U.S. Pat. No. 6,654,047, granted on Nov. 25, 2003, to Hzaka and entitled "METHOD OF AN DEVICE FOR ACQUIRING INFORMATION ON A TRAFFIC LINE OF PERSONS";

U.S. Pat. No. 7,688,349, granted on Mar. 30, 2010, to Flickner et al. and entitled "METHOD OF DETECTING AND TRACKING GROUPS OF PEOPLE";

U.S. Pat. No. 8,401,230, granted on Mar. 19, 2013, to Kozitsky et al. and entitled "SIGNATURE BASED DRIVE-THROUGH ORDER TRACKING SYSTEM AND METHOD";

U.S. Patent Publication No. 2013-0265419A1, published on Oct. 10, 2013, to Bulan et al. and entitled "SYSTEM AND METHOD FOR AVAILABLE PARKING SPACE ESTIMATION FOR MULTISPACE ON-STREET PARKING";

U.S. Patent Publication No. 2014-0063256A1, published on Mar. 6, 2014, to Mongeon et al. and entitled "QUEUE GROUP LEADER IDENTIFICATION";

U.S. Patent Publication No. 2014-0063263A1, published on Mar. 6, 2014, to Bernal et al. and entitled "SYSTEM AND METHOD FOR OBJECT TRACKING AND TIMING ACROSS MULTIPLE CAMERA VIEWS";

U.S. Patent Publication No. 2014-0064566A1, published on Jun. 6, 2014, to Shreve et al. and entitled "HEURISTIC-BASED APPROACH FOR AUTOMATIC PAYMENT GESTURE CLASSIFICATION AND DETECTION";

Agent VI, "Video Analytics Applications for the Retail Market", created Jan. 23, 2012, http://www.agentvi.com/images/Agent_Vi_-_Retai_Applications.pdf;

Bay et al., "SURF: Speeded Up Robust Features", Computer Vision and Image Understanding, V. 110.3, 2008, p 346-359;

Comaniciu et al., "Real-Time Tracking of Non-Rigid Objects Using Mean Shift", Proceedings of IEEE Conference on Computer Vision and Pattern Recognition, 2000, p 142-149;

Dalai et al., "Histograms of Oriented Gradients for Human Detection", 2005;

Dickmanns et al., "Dynamic Monocular Machine Vision", Machine Vision and Applications, 1988, p 223-240;

Forssen et al., "Shape Descriptors for Maximally Stable Extremal Regions", Proceedings of IEEE Conference on Computer Vision and Pattern Recognition, 2007;

Gustafsson et al., "Particle Filters for Positioning, Navigation and Tracking", IEEE Transactions on Signal Processing, 2002;

Harris et al., "A Combined Corner and Edge Detector", Alvey Vision Conference, Vol. 15, 1988, p 147-152;

Honeywell Security, "Intelligent Video Analytics for: The Retail Applications Market", September 2007, http://www.security.honeywell.com/uk/video/documents/VideoAnalytics_Retail_ UK.pdf;

Horn et al., "Determining Optical Flow", Artificial Intelligence 17, 1981, p 185-203;

Huang et al., "Survey on Block Matching Motion Estimation Algorithms and Architectures With New Results", Journal of VLSI Signal Processing Systems 42, 2006, p 297-320;

Kass et al., "Snakes: Active Contour Models", International Journal of Computer Vision, 1988, p 321-331;

Ke et al., "PCA-SIFT: A More Distinctive Representation for Local Image Descriptors", Proceedings of IEEE Conference on Computer Vision and Pattern Recognition, 2004;

Lo et al., "Automatic Congestion Detection System for Underground Platforms", Proceedings of 2001 International Symposium on Intelligent Multimedia, Video and Speech Processing, May 2-4, 2001, p 158-161;

Lowe, "Distinctive Image Features From Scale-Invariant Keypoints", 2004, p 91-110;

Makarov, et al., "Intrusion Detection Using Extraction of Moving Edges", 12th IAPR Int'l Conf. on Pattern Recognition, V.1, 1994, p 804-807;

Oliver et al., "A Bayesian Computer Vision System For Modeling Human Interactions", IEEE Transactions on Pattern Analysis and Machine Intelligence, Vol. 22, No. 8, August 2000, p 831-843;

Pillar, Real Value in Video Analytics, Integrated Solutions for Retailers, Jul. 26, 2010, http://www.retailsolutionsonline.com/doc/real-value-in-video-analytics-0001;

Retail Touch Points, "Video Analytics Solutions Help Retailers Optimize Customer Service and Workforce management", Dec. 9, 2011, http://www.retailtouchpoints.com/retail-store-ops/1230--video-analytics-solutions-help-retailers-optimize-customer-service-and-workforce-management-;

Rosten et al., "Machine Learning for High-Speed Corner Detection", Computer Vision ECCV 2006, p 430-443;

Schmitt, "Checking In On "Minority Report" Video Analytics and Hyper-Targeting in Retail", Retail Touch Points, Feb. 3, 2011, http://www.retailtouchpoints.com/in-store-insights/714-checking-in-on-minority-report-video-analytics-and-hyper-targeting-in-retail;

Scopix Solutions, "Retail Video Analytics", http://vvw-w.scopixsolutions.com/solutions/;

Senior et al., "Video Analytics for Retail", 2007, http://rogerioferis.com/publications/FerisAVSSO7b.pdf;

Stauffer et al., "Adaptive Background Mixture Models for Real-Time Tracking", Proceedings of the 1999 Conference on Computer vision and Pattern Recognition, 1999, p 2246-2252;

Tomasi et al., "Detection and Tracking of Point Features", Technical Report CMU-CS-91-132, Carnegie Mellon University, School of Computer Science, 1991; and Zhu et al., "Face Detection, Pose Estimation, and Landmark Localization in the Wild", Proceedings of IEEE Conference on Computer Vision and Pattern Recognition, 2012, are incorporated herein by reference in their entirety.

BRIEF DESCRIPTION

In one embodiment of this disclosure, described is a computer-implemented image based method of determining and communicating a busyness metric associated with a number of people within an area captured by one or more image capturing devices, the method comprising: a) acquiring one or more images of the area from the one or more image capturing devices; b) calculating a representation of the number of people within the area from the acquired one or more images of the area, the representation of the number of people calculated using a regression model trained with a training set of images; c) calculating the busyness metric as a function of the representation of the number of people within the area; and d) communicating the busyness metric to one or more of an electronic device associated with a user, a data storage device and a post processing device.

In another embodiment of this disclosure, described is an image processing system comprising: a memory and a processor in communication with the processor, the memory and processor configured to receive digital images from one or more image capturing devices directed on an area, and execute instructions to perform an image based method of determining and communicating a busyness metric associated with a number of people within the area, the method comprising: a) acquiring video of the area from the one or more of image capturing devices; b) calculating a representation of the number of people within the area from the acquired one or more images of the area, the representation of the number of people calculated using a regression model trained with a training set of images; c) calculating the busyness metric as a function of the representation of the number of people within the area; and d) communicating the busyness metric to one or more of an electronic device associated with a user, a data storage device and a post processing device.

In still another embodiment of this disclosure, described is a computer program product comprising: a non-transitory computer-usable data carrier storing instructions, that, when executed by a computer, cause the computer to perform an image based method of determining and communicating a busyness metric associated with a number of people within an area captured by one or more image capturing devices, the method comprising: a) acquiring one or more images of the area from the one or more image capturing devices; b) calculating a representation of the number of people within the area from the acquired one or more images of the area, the representation of the number of people calculated using a regression model trained with a training set of images; c) calculating the busyness metric as a function of the representation of the number of people within the area; and d) communicating the busyness metric to one or more of an electronic device associated with a user, a data storage device and a post processing device.

DETAILED DESCRIPTION

Figure 1:
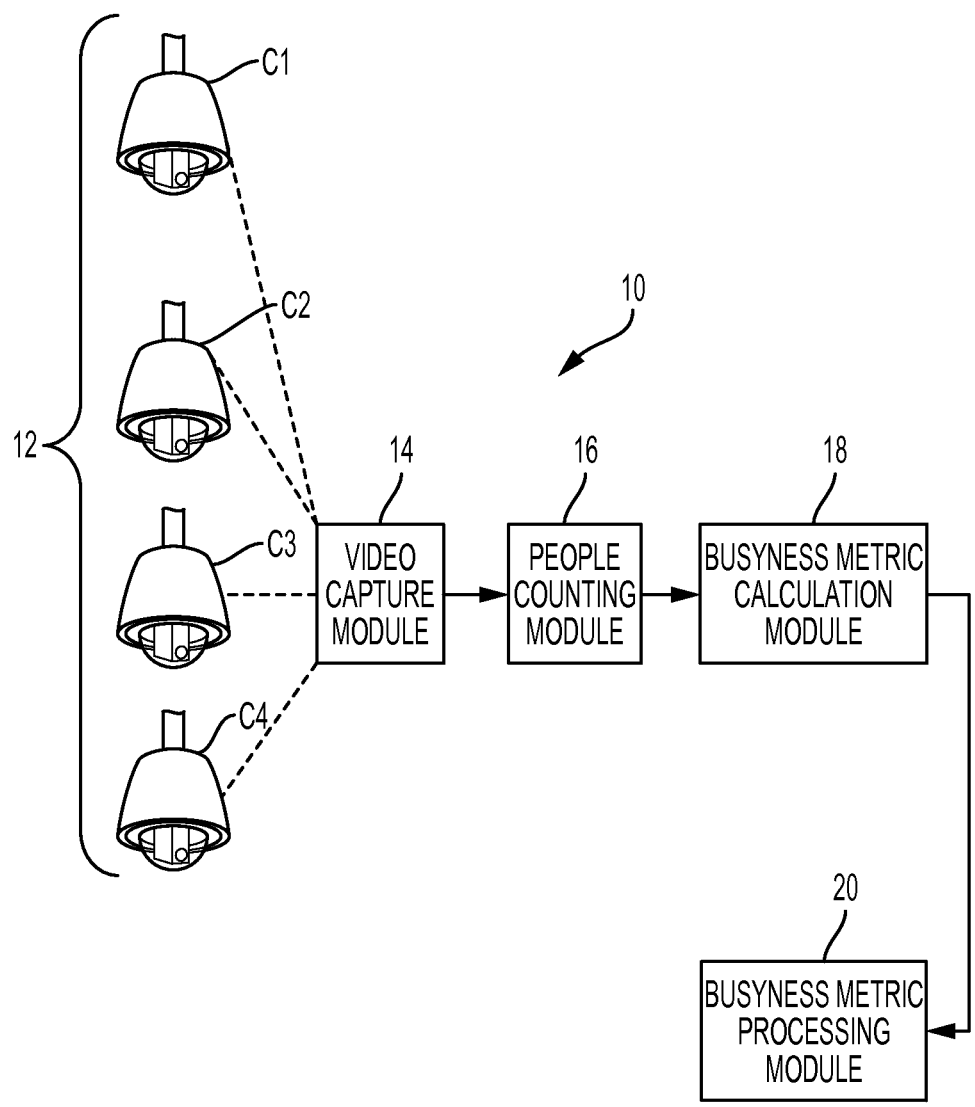
FIG. 1 is a flow chart of a method of determining and communicating a busyness metric according to an exemplary embodiment of this disclosure.

This disclosure provides a video-based method and system including multiple cameras to capture multiple regions of interest (ROI) associated with an area to be monitored for busyness. The method and system uses computer vision algorithms to identify people and calculates the number of people in each ROI over time. An anomalous event is defined in two ways: (1) a rapid change in the number of people entering or exiting an ROI, or (2) the number of people differing significantly from an expected number of people for a particular time of the day in the ROI. When an anomalous event occurs, the method and system produce a notification that characterizes the nature of the anomalous event. The disclosed method and system may provide incremental advantages with respect to resource allocation in a store. In addition, the disclosed method and system may provide significant gains in resource allocation in larger areas, such as an airport or food court.

The disclosed method and system is video-based and includes the use of one or more cameras to capture an area and estimate a number of customers in various regions of interest over time. The system determines a count, B, defined as the number of customers over a given time. If B is greater than a busyness threshold, then a store manager is notified. The thresholds for busyness can vary by store, day, and time of day, and are learned by the system or are based on prior data. Based on notification, the manager may rearrange her resources quickly to support the higher volume. Automation of store busyness allows the manager to concentrate on other important tasks, and avoids the current problem of working in a reactionary mode. If B is less than the lower busyness threshold, the manager is again notified. When the volume is below normal, for example, the manager can assign resources to the most productive tasks.

Due to advances and increased availability of surveillance technology over the past few decades, it has become increasingly common to capture and store video footage of retail settings for the protection of companies, as well as for the security and protection of employees and customers. However, this data has also been of interest to retail markets for its potential for data-mining and estimating consumer behavior and experience. Modern retail processes are becoming heavily data driven, and retailers therefore have a strong interest in numerous customer and store metrics such as queue lengths, experience time in-store and drive-through, specific order timing, order accuracy, and customer response.

The present disclosure provides a measurement method and system for counting the number of people in an area, and notifying a user when the busyness of the area of interest exceeds predetermined limits. The method and system includes one or more of the following features:

A camera network system for detecting people within an area of interest;

Measuring the number of people detected from each camera, and calculating a combined people count for the plurality of cameras;

Calculating one or more busyness metrics;

Comparing the calculated busyness metric(s) with upper and lower threshold levels, where the levels may vary within a day, as well as day to day, depending on prior data;

Notifying a user when the store is deemed "busy", "normal", and "light"; and

Making available real-time busyness statistics for one or more shifts.

With reference to FIG. 1, a system 10 in accordance with the present disclosure comprises a plurality of modules, illustrated schematically in FIG. 1. The system 10 includes a Video Capture Module 14 that acquires visual data (e.g., video frames or image frames) of customer space, such as a retail establishment, restaurant, etc. The video capture module is operatively associated with a plurality of cameras, which may be surveillance cameras or the like. A people counting module 16 receives the visual data from the cameras and counts people within the customer space. A busyness metric module calculation 18 calculates busyness metrics, such as the number of people counted during a sequence of video frames representative of a time period. The Busyness Metric Processing Module 20 further processes the calculated busyness metric to determine, for example, if busyness is low, normal or high, where a high or low busyness determination results in notifying a responsible manager and/or recording the event for further analysis at another time.

In an exemplary embodiment, the video network 12 can include at least one surveillance camera that captures video of an area including the ROI. No special requirements in terms of spatial or temporal resolutions are needed for most applications. Traditional surveillance cameras are typically IP (Internet Protocol) cameras with pixel resolutions of VGA (640×480) and above and frame rates of 15 fps and above. Such cameras are generally well-suited for this application. Higher resolution cameras can also be utilized, as well as cameras having other capabilities such as IR and thermal imaging cameras, for example.

Figure 2:
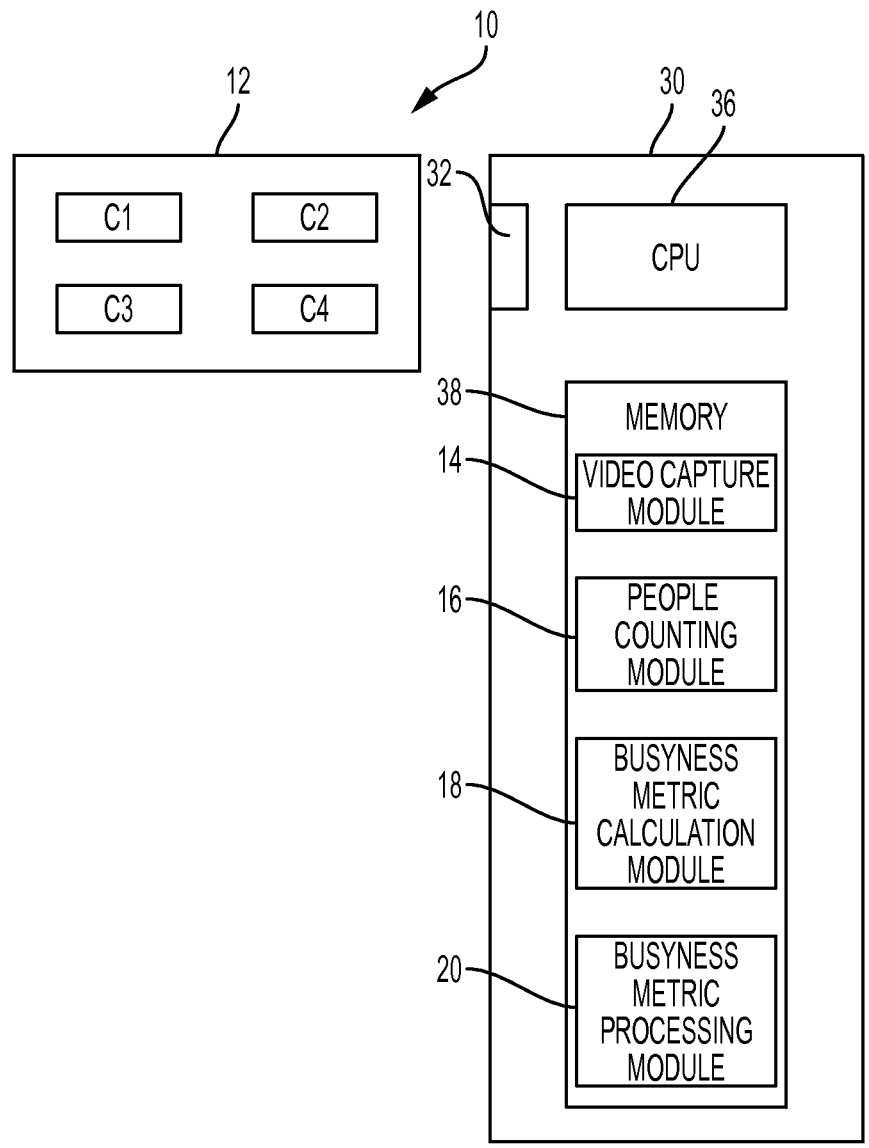
FIG. 2 is a block diagram of a system for determining and communicating a busyness metric according to an exemplary embodiment of this disclosure.

In FIG. 2, the exemplary system 10 is illustrated in block diagram form in connection with a customer space 22. It will be appreciated the video camera network capture module 12 is shown as a plurality of cameras C1, C2, C3 and C4. At least one of cameras C1, C2, C3 and C4 may be an overhead camera adapted to view a payment station, such as the region about a cash register or card reader, from overhead to detect customers at a POS (Point of Sale).

The cameras C1, C2, C3 and C4 are connected to a computer 30 and supply visual data including one or more image frames via a communication interface 32. It is to be understood that computer 30 can be a standalone unit configured specifically to perform the tasks associated with aspects of this disclosure. In other embodiments, aspects of this disclosure can be integrated into one or more existing systems, computers, etc. The communication interface may be a wireless or wired communication interface 32 depending on the application. Computer 30 further includes a CPU (central processing unit) 36 operatively associated with a memory 38 which includes CPU executable instructions and other computer readable code associated with the video capture module 14, the People Counting Module 16, the Busyness Metric Calculation Module 18, and the Busyness Metric Processing Module 20.

Figure 3:
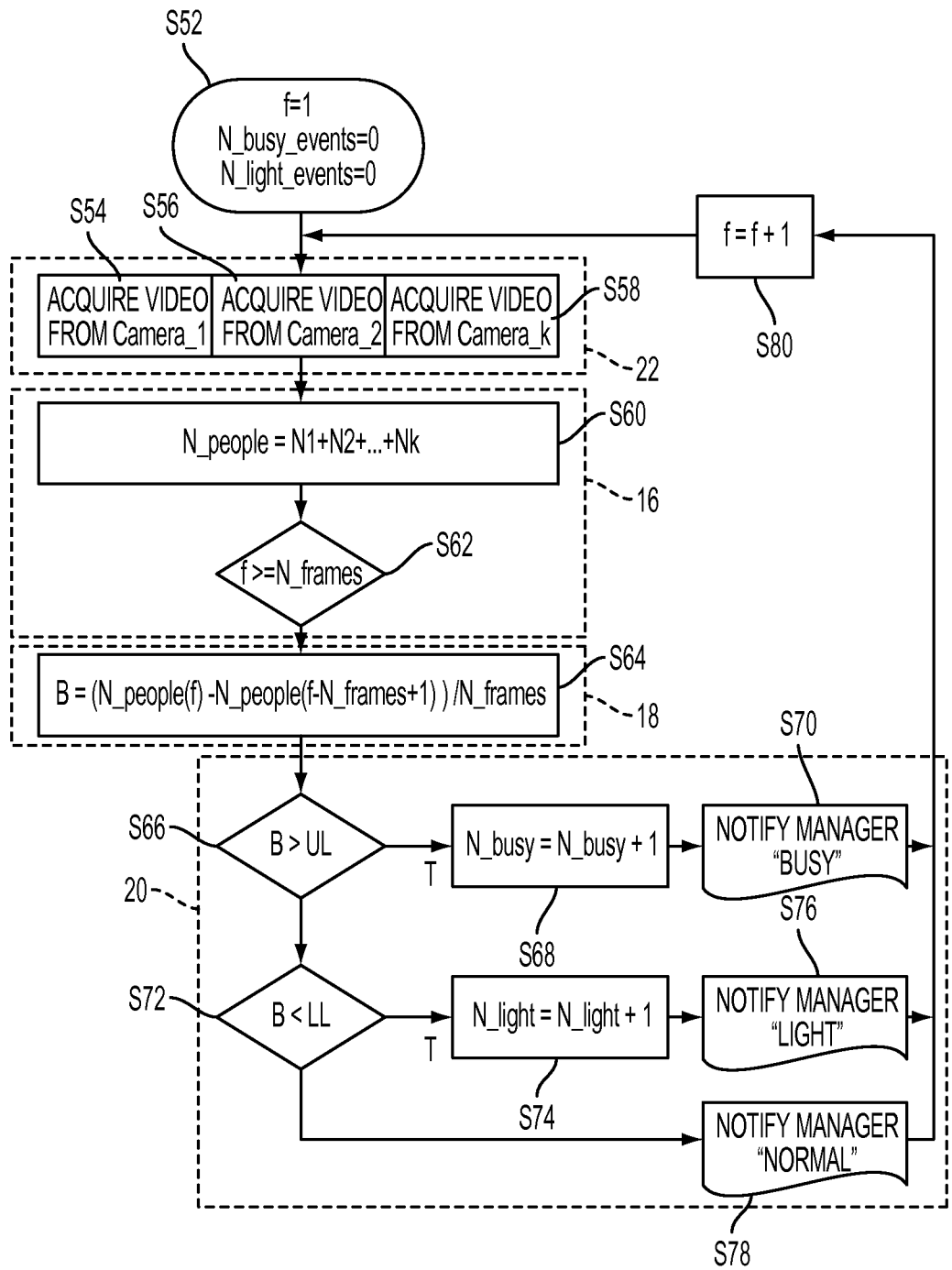
FIG. 3 is a flow chart of a method for detecting store busyness and notifying a manager according to an exemplary embodiment of this disclosure.

With reference to FIG. 3, illustrated is a flow chart of a method for detecting store busyness and notifying a manager according to an exemplary embodiment of this disclosure where, f=frame number;
k=number of cameras
N_frames=number of frames over which to calculate metric;
B=busyness metric;
UL=upper limit threshold for busyness metric, when to notify manager;
LL=lower limit threshold for busyness metric, notifying manager;
N_busy=number of busy occurrences;
N_light=number of light occurrences;
$N_i$=number of people viewed in the ith camera;

$N\_people(f)$ = number of people in an $ROI$ at frame $f$;

$$= N_1 + N_2 + \ldots N_k.$$

Initially, at step S52, frame number counter f, is N_busy_events counter, and N_light_events counter are initialized.

Next, at steps S54, S56 and S58, video frames are acquired from Camera_1, Camera_2, through Camera_k, respectively.

Next, at step S60, the method determines, i.e., counts, the total number of people detected in all of the acquired video frames.

Next, at step S62, counter f is compared to a predetermined total number of frames, N_frames, to be processed, N_frames representing a time interval to determine busyness associated with the area covered by video cameras C1, C2 . . . Ck and/or the ROI(s associated with video cameras C1, C2 . . . Ck.

Next, at step S64, after the method has processed N_frames, busyness metric B is calculated, where $$B=(N\_people(f)-N\_people(f-N\_frames+1))/N\_frames.$$

Next, at step S66, busyness metric B is compared to UL, a predefined upper limit threshold of busyness. If busyness metric B is great than UL, N_busy occurrence counter is incremented (S68) and an appropriate person, such as the manager of a store, retail area, etc., is electronically notified (S70) that the covered area is "busy" via email, cell phone text, smart phone text, voice message, etc.

If busyness metric B is not greater than upper limit threshold UL, the method performs step S72 and compares busyness metric B to lower limit threshold LL. If busyness metric B is less than LL, N_light occurrence counter is incremented (S74) and the appropriate person is electronically notified the busyness associated with the covered area is "light" (S76).

If the calculated busyness metric B is not greater than UL and not less than LL, the method performs step S78 and electronically notifies the appropriate person that the busyness associated with the covered area is "normal".

Step S80 increments frame number counter f and the method repeats by acquiring a new set of video frames, updating the busyness metric B and electronically notifying the appropriate person of the busyness, i.e., "busy", "light" or "normal" associated with the covered area, as previously described.

Various aspects of the busyness metric method and associated modules are provided below.

The camera network system 12 captures and provides video of an area within a store where customers congregate, shop, etc.

Figure 4:
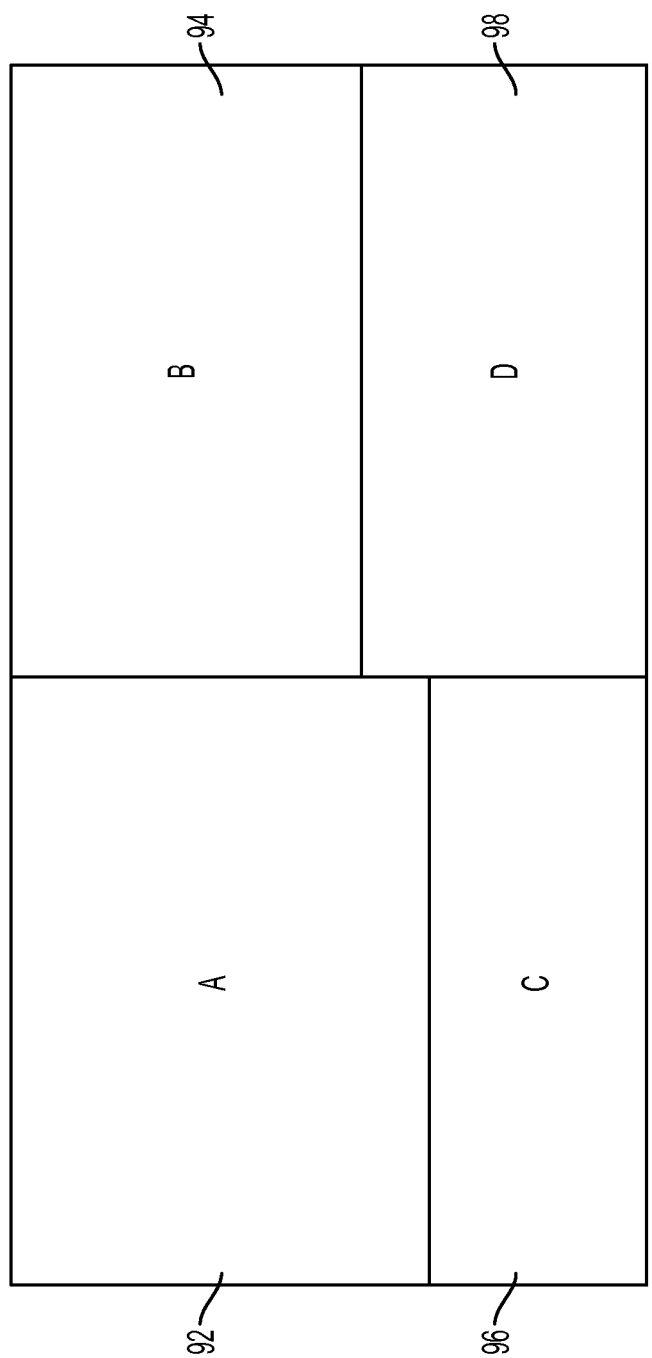
FIG. 4 illustrates an area monitored using four overhead cameras, ABCD according to an exemplary embodiment of this disclosure, where each camera is associated with an ROI (Region of Interest) designed such that the entire area ABCD is monitored by the cameras.

FIG. 4 illustrates an example of an area which is monitored by four overhead cameras 92, 94, 96 and 98 associated with the camera network system 12. Each camera possesses its own region of interest (ROI) A, B, C and D, respectively, within the entire store area. The ROI's are designed so that the entire area is covered, and objects are not double-counted near the ROI boundaries. The goal is to cover the entire area of interest, manage overlapping FOV (Field of View) for proper camera handoff, and avoid double counting for people count estimation.

The People Counting Module 16 measures the number of customers detected from each camera, as well as a combined people count for a plurality of cameras.

For frame, f, each camera detects people using a people counting algorithm applied over a region of interest, ROI. The algorithm segments foreground objects, in this case customers, calculates features, and estimates the number of people in the scene. The total people in the area are determined by summing up the number of people detected in each camera.

The Busyness Metric Calculation Module 18 calculates the "busyness" metric, B, for each frame by calculating the derivative of N_people with respect to a time interval, or frame number. For example, in a given day, a manager may be interested in detecting sudden bursts in customer volume over the past 5 minutes. To calculate the busyness metric associated with this, the parameter N_frames is determined as follows:

$N\_frames=t\_Interval*frame\_rate$, where for a 5 minute interval with a camera operating at 15 frames per second, $N\_frames=5\times15=75$ frames.

The busyness metric is calculated as, $$B=(N\_people(f)-N\_people(f-N\_frames+1))/N\_frames,$$

The Busyness Metric Processing Module 20 compares the calculated busyness metric with upper threshold level UL and lower threshold level LL, to indicate a busy or light event, respectively:

B>UL indicates a busy event;
B<LL indicates a light event.

When the thresholds are met, N_busy and N_light are respectively incremented to obtain a total number of busy and light events for a day, shift, or monitoring period. These levels vary within a day as well as day to day, depending on store history, and the manager may be notified when the store is deemed "busy", "normal", and "light".

The system can communicate a status to the store manager by a plurality of methods, such as mobile—email notification; pad—web-based notification communicated to a management "dashboard" or store management system; and mobile-text message notification, vibrate or sound alert.

Real time busyness statistics calculated by the Busyness Metric Processing Module 20 provide "end of shift" performance evaluation to the store manager with one or more of the following metrics:

Number of "busy" occurrence's for the shift, with a comparison against expectation;

Metric informing the store manager if the appropriate resource to handle the customer volume were planned; and Number of "light" event occurrence's for the shift, with a comparison against expectation.

Figure 5:
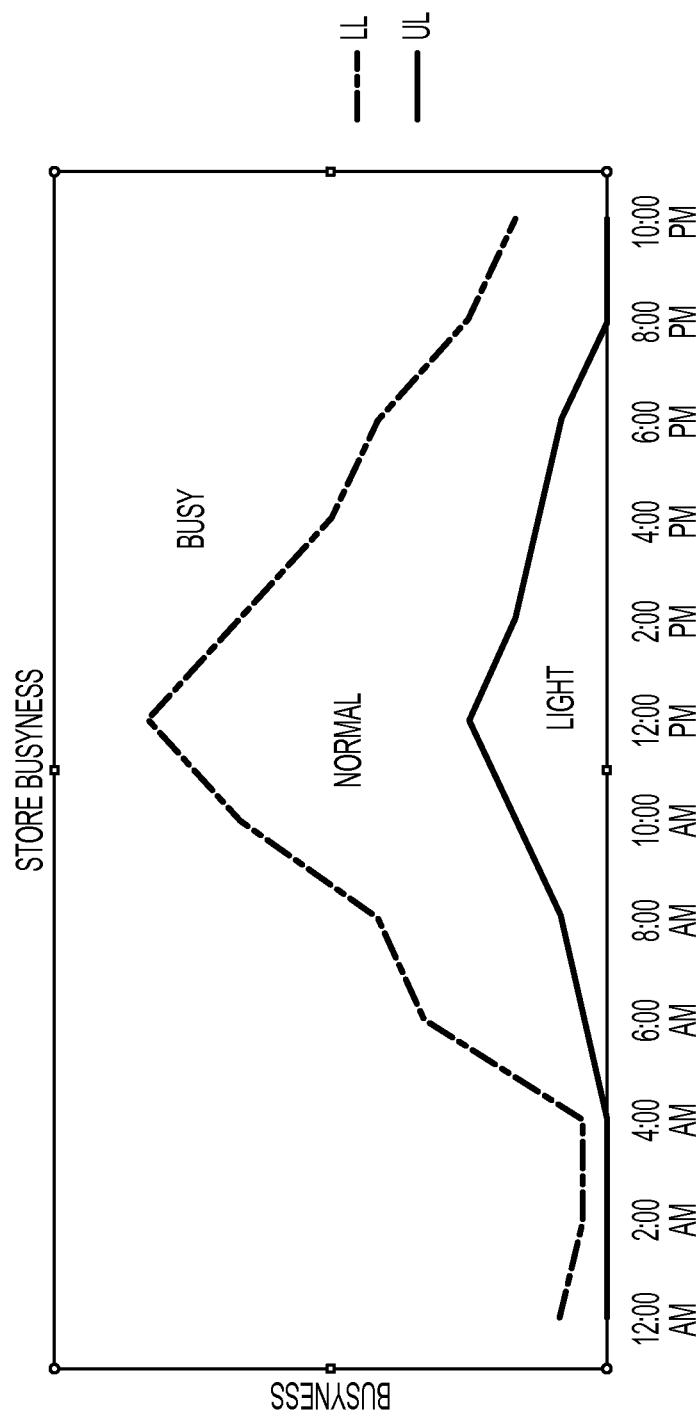
FIG. 5 is a plot of busyness detected over the span of a day according to an exemplary embodiment of this disclosure.

With reference to FIG. 5, illustrated is an example plot of busyness detected over the span of a day according to an exemplary embodiment of this disclosure. The busyness limits over a day define thresholds for manager notification. In this example, the store is expected to be busiest at noon, and it is expected that the busyness profile will correspond to a store resource profile.

Figure 6:
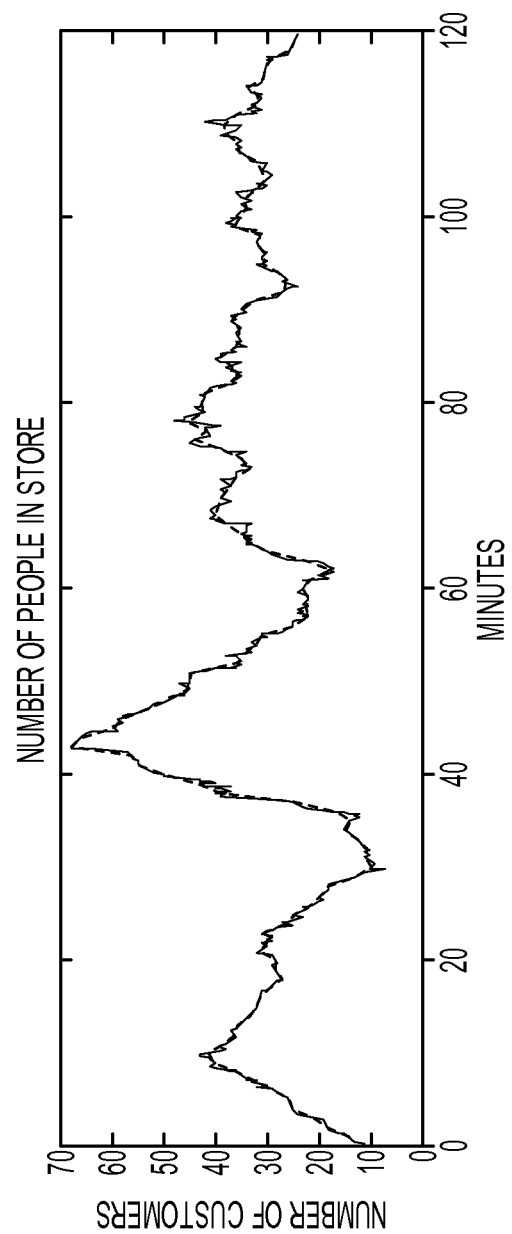
FIG. 6 is a plot of busyness detected over a 2 hour period according to an exemplary embodiment of this disclosure, where the "number of customers" corresponds to the number of customers in the store.

FIG. 6 illustrates an example of busyness detected over a 2 hour period according to an exemplary embodiment of this disclosure, where the "number of customers" corresponds to the number of customers in the store.

Figure 7:
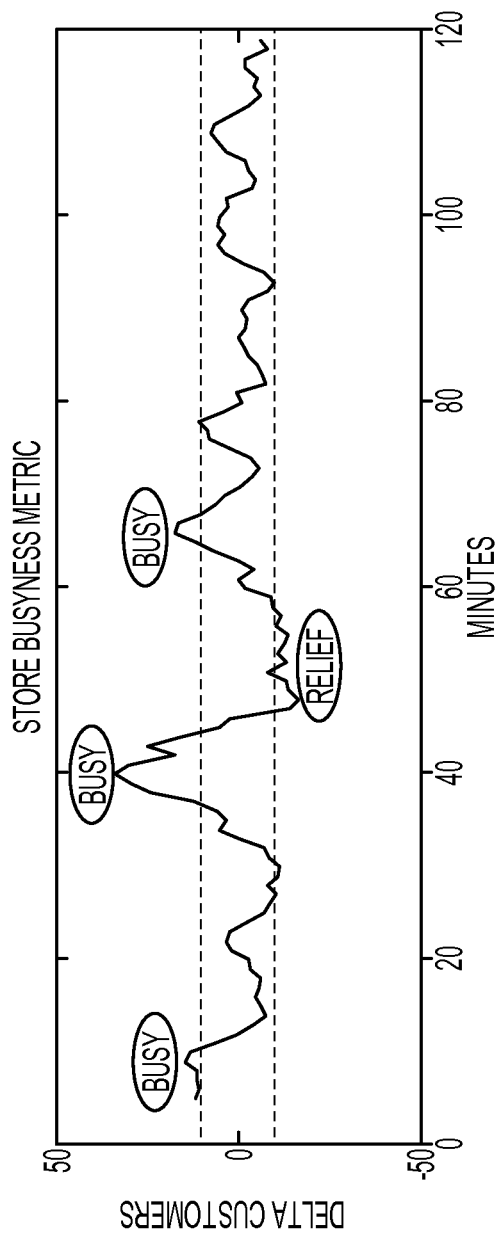
FIG. 7 is a plot of busyness detected where busyness is associated with the "change in the number of customers in a store over a 5 minute time interval", according to an exemplary embodiment of this disclosure.

FIG. 7 illustrates an example of busyness detected is a plot of busyness detected where busyness is associated with the "change in the number of customers in a store over a 5 minute time interval", according to an exemplary embodiment of this disclosure.

As the busyness metric crosses an upper or lower threshold, a manager is notified.

Figure 8:
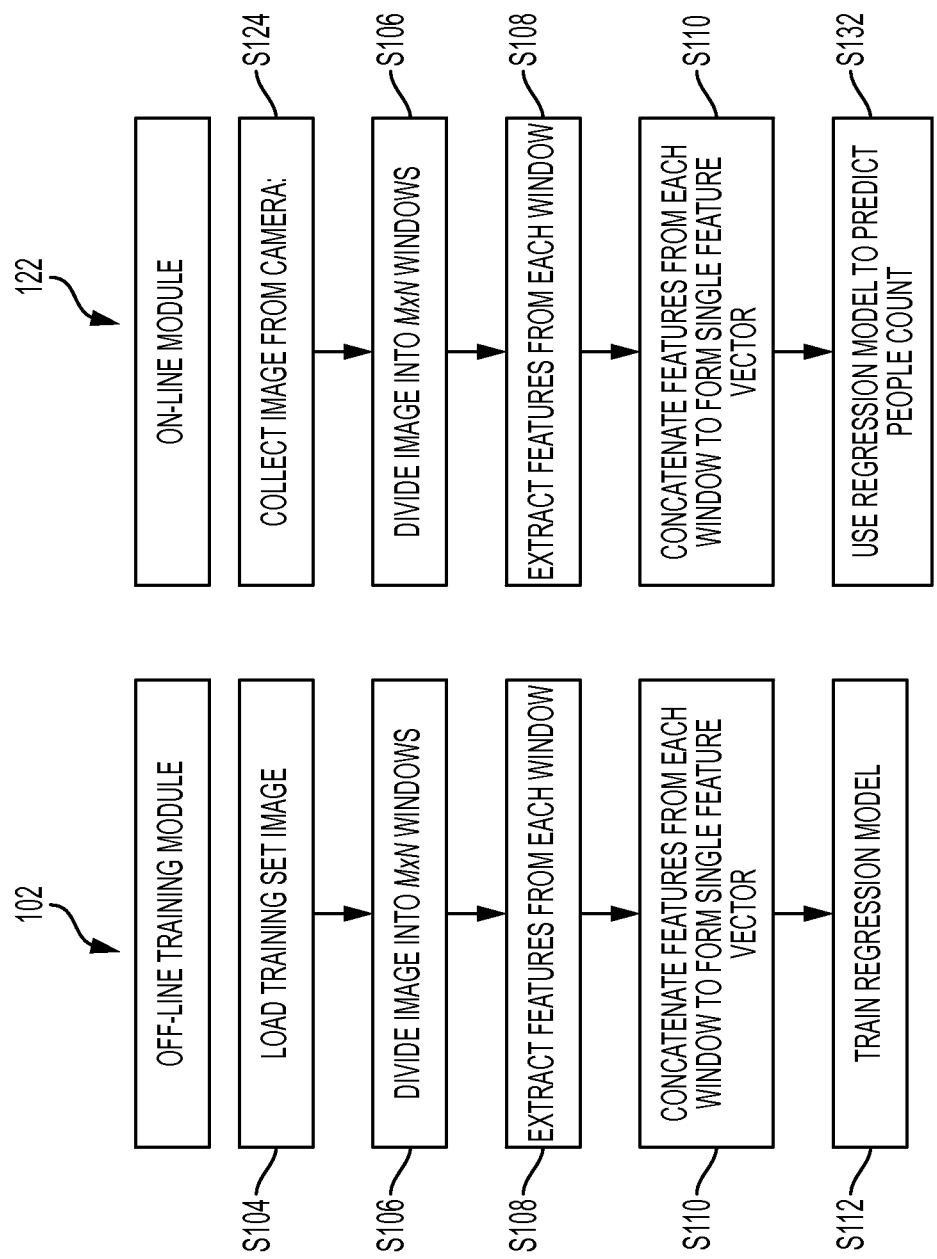
FIG. 8 includes flow charts of an off-line training module process and an on-line module process according to an exemplary embodiment of this disclosure.

With reference to FIG. 8, illustrated are flow charts of an off-line training module 102 process and an on-line module process 122 according to an exemplary embodiment of this disclosure.

Various aspects of the Off-line 102 Module are now provided.

At step S104, load training set image (off-line module only)

During this step, each image in the training set is loaded into memory and prepared for further processing.

Next, at step S106, divide image into M×N windows.

Figure 9:
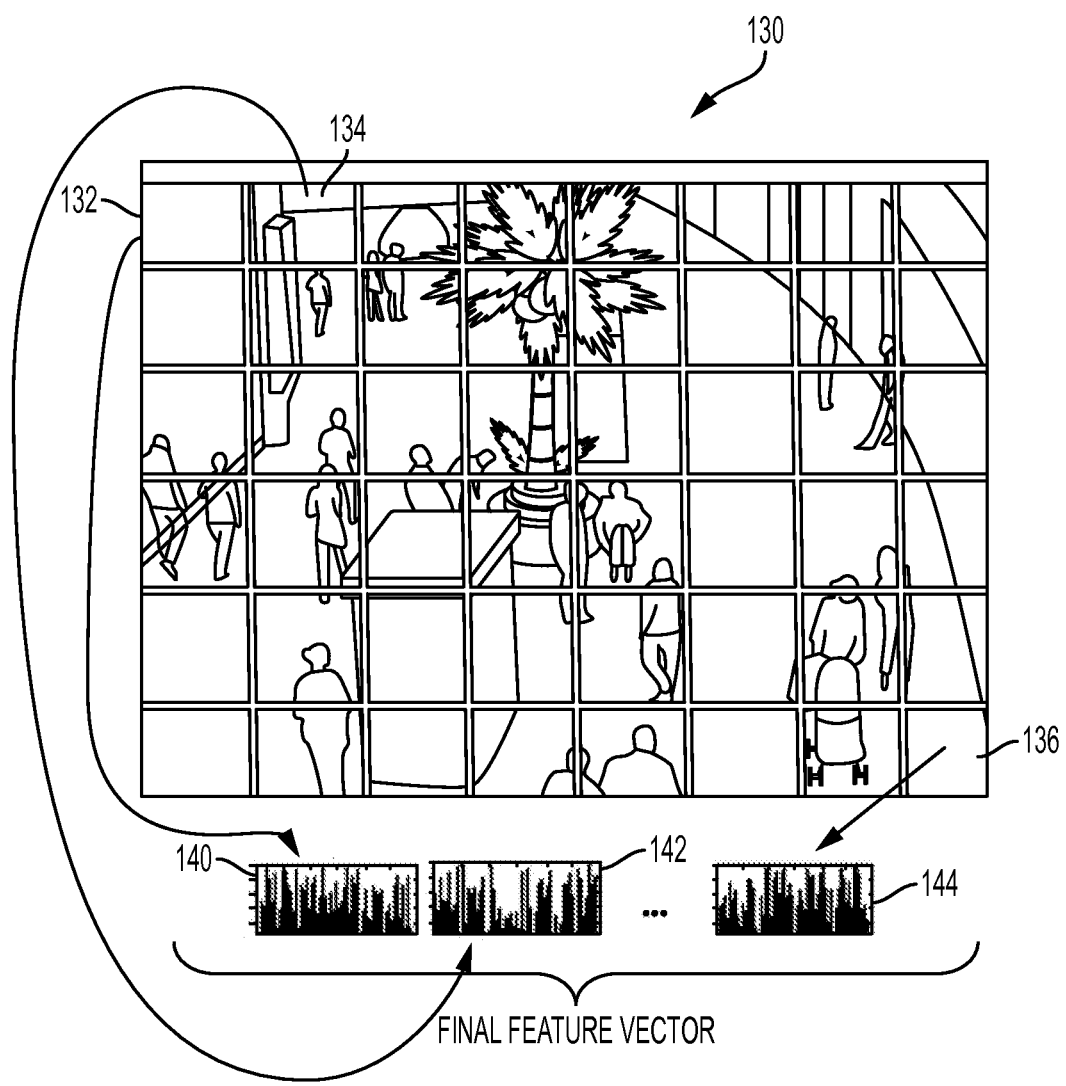
FIG. 9 illustrates an example ROI associated with an image capture device, the ROI segmented into a plurality of windows according to an exemplary embodiment of this disclosure.

First, the image is first divided into M×N windows 130 (see FIG. 9). The choice of M and N can depend on several factors including the scene geometry, or camera distortions such as skew. Higher choices of M and N will allow the algorithm to adapt to spatial variations in the image, but will create a larger feature vector that can increase the complexity of training as well as the time needed to extract features. Conversely, a lower choice of M and N will indicate that the perspective is relatively uniform across the image (i.e., from a fixed overhead view captured with a rectilinear camera) and will result in a smaller feature vector, thus less time to train and extract features.

To further illustrate, reference characters 132, 134 and 136 indicate only 3 windows of a total of 48 M×N windows, where Final Feature Vectors 140, 142 and 144 correspond to windows 132, 134 and 136, respectively.

Next, at step S108, extract features from each window.

In the present embodiment, uniform LBP features are extracted from each window. Other features that could be used include color, foreground pixels, edges, SURF, HOG, Gabor, among others or any combination thereof.

Next, at step S110, concatenate features from each window to form a single feature vector.

Figure 10:
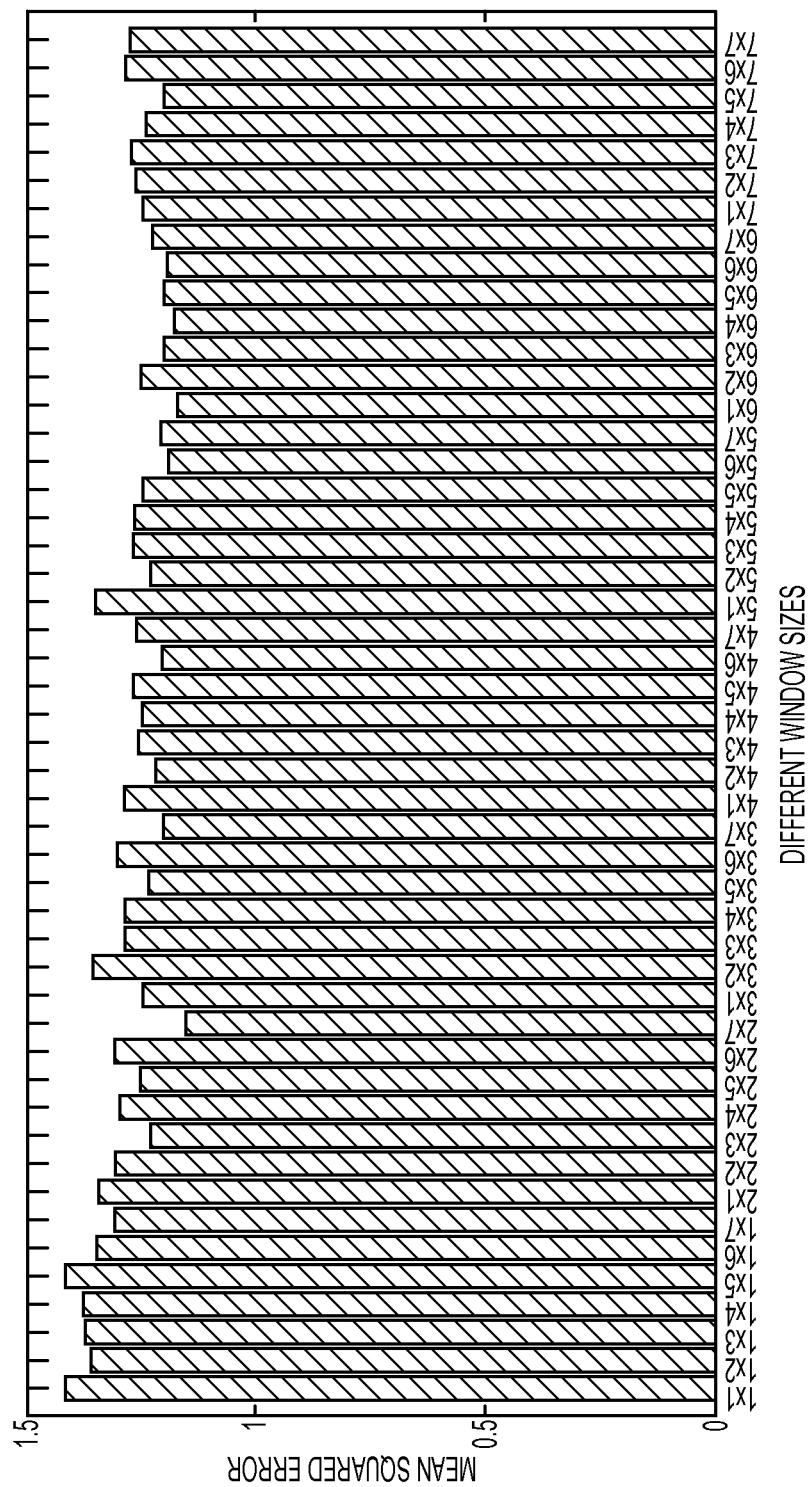
FIG. 10 is an exemplary plot of a mean squared-error associated with different window sizes.

Each window in the image contributes a set of features that are concatenated to form a single feature vector (see FIG. 10) that is of the dimension 50×N×M.

Each training image contributes a single feature vector, as well as a ground-truth count of the number of people in the scene. Regression is used to form a generalized relationship between the feature vectors data and the number of people in the scene. In the present embodiment, a regression tree model is used to generate the results shown in FIG. 10. In this figure, it is seen that the root mean squared error is less than 1.5 for all window sizes, which implies that the model is fit to predict the number of people with an accuracy of +−1.22.

Next, at step S112, the regression module is trained based on a series of positive and negative training video samples.

After the regression model is trained, the model is used to predict the number of people in a new image, as performed according to On-line Module 122.

At step S124, new images are collected from the video cameras.

At step S106, similarly to the Off-line Training Module, divide image into M×N windows.

The image is divided into M×N windows, consistent with the M×N windows parameters used during execution of the Off-line Training Module 102.

Next, at step S108, similarly to the Off-line Training Module, the On-line Module extracts features from each window and then at step S110, concatenates features from each window to form a single final feature vector.

At step S132, the single final feature vector is provided to the trained regression model to determine the number of people present in the area covered by the video cameras and/or associated ROIs.

Figure 11:
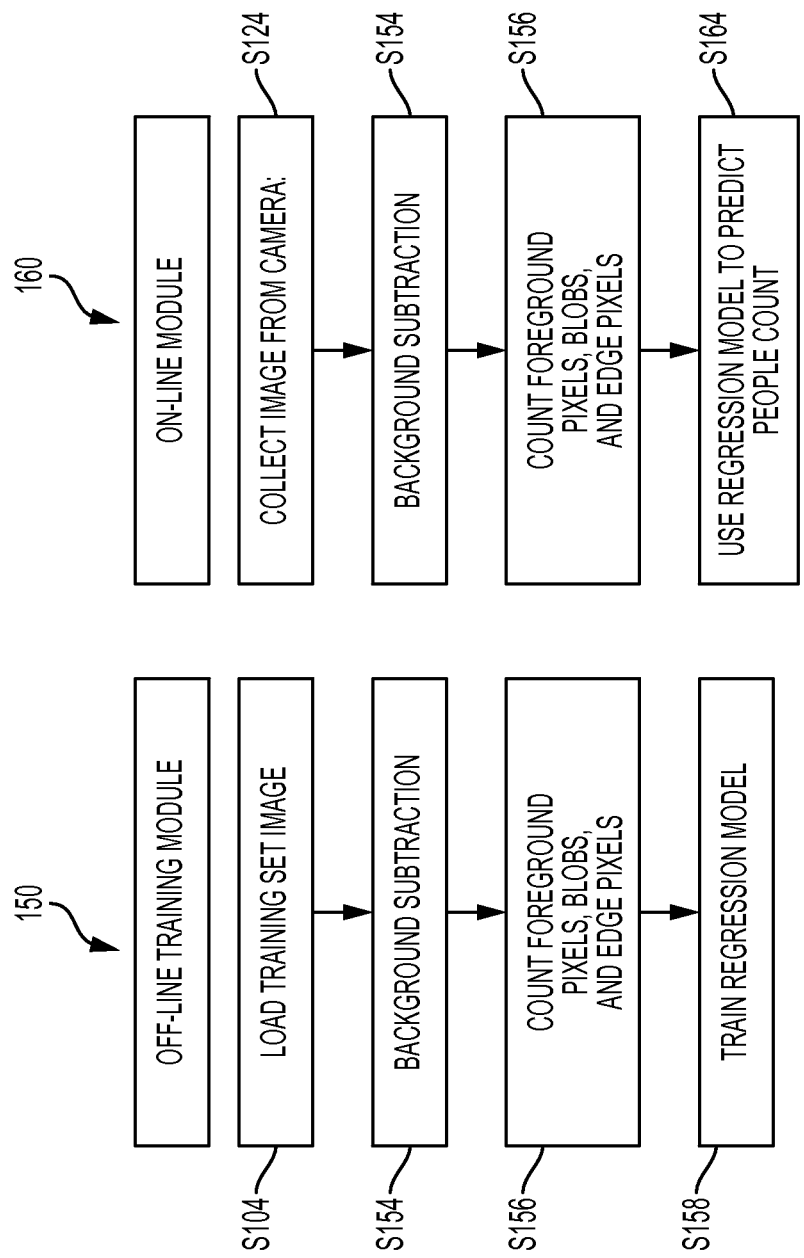
FIG. 11 includes flow charts of another off-line training module process and another on-line module process according to an exemplary embodiment of this disclosure.

With reference to FIG. 11, illustrated are flow charts of another Off-line Training Module process and another On-line Module process according to an exemplary embodiment of this disclosure.

Various aspects of the Off-line and On-line Module are now provided.

Step S104. Load training set image (off-line module only)

Each image in the training set is loaded into memory and prepared for further processing.

Step S124. Collect image from camera (on-line module only)

Images are loaded from the camera in order to predict the number of people in the scene.

Step S154. Background subtraction. (off-line and on-line module)

In this step, foreground pixels are detecting using background subtraction. By maintaining an estimate of the background and comparing each incoming frame with that estimate, pixels that are significantly different from the estimated background can be considered foreground pixels. Foreground pixels can also be detected by performing frame differencing, where consecutive frames are compared for significant differences among them; pixels where large differences are found likely contain portions of the scene where motion is present between the frames in question. These foreground pixels can then be further analyzed to find blobs, or clusters of foreground pixels.

Step S156. Count foreground pixels, blobs, and extract other features from image (off-line and on-line module)

The total number of foreground pixels is summed to become the first element in the feature vector, which is calculated for each image. The next element in the feature vector is the total number of edge pixels oriented vertically and horizontally. Edge pixels are determined using the Canny edge detector, however other edge detectors such as the Sobel, compass, and Laplacian of Gaussian operators could be used, among others. Features other than edges could also be included in the feature vector such as color, SURF, HOG, or Gabor. In the present embodiment, the summed total of foreground pixels, blobs, and horizontal and vertical edges are used, creating a 4 dimensional feature vector.

Step S158. Train Regression Module (off-line module only).

Each training image contributes a single feature vector, as well as a ground-truth count of the number of people in the scene. Regression is used to form a generalized relationship between the feature vectors data and the number of people in the scene. In the present embodiment, we used a regression tree model to generate the results shown in FIG. 10. In this figure, we see that the root mean squared error is less then Step S164. Use regression module to predict people count.

After the regression model is trained, we are then able to use this model to predict the number of people in the scene in a new image.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented image based method of determining and communicating a busyness metric associated with a number of people within an area captured by one or more image capturing devices, the method comprising:
    a) acquiring one or more images of the area from the one or more image capturing devices;
    b) calculating a representation of the number of people within the area from the acquired one or more images of the area, the representation of the number of people calculated using a regression model trained with a training set of images, the regression model configured to receive an input feature vector associated with an acquired image and output a number of distinct people associated with the input feature vector associated with the acquired image;
    c) calculating the busyness metric as a function of the representation of the number of people within the area, the busyness metric related to the calculated representation of people within the area during a sequence of acquired images representative of a predetermined time period; and
    d) communicating the busyness metric to one or more of an electronic device associated with a user, a data storage device and a post processing device,
    wherein step b) includes:
    b1) dividing each of the one or more acquired images into a plurality of windows;
    b2) extracting feature vectors from each of the plurality of windows;
    b3) concatenating the extracted feature vectors to form a single feature vector representation of the number of people within the area covered by the plurality of windows; and
    b4) inputting the single feature vector to the regression model to determine the number of people within the area covered by the plurality of windows.

2. The computer-implemented image based method of determining and communicating a busyness metric according to claim 1, wherein step d) electronically notifies a person if an anomalous event has occurred, the anomalous event defined as one or more of (a) a rapid change in the number of people entering or exiting the area, and (b) the number of people within the area differing significantly from an expected number of people within the area for a time of day associated with the captured video.

3. The computer-implemented image based method of determining and communicating a busyness metric according to claim 1, wherein the area is associated with one of a retail store counter, a customer service center, a private event, a public event, an airport, a train station, a bus station, and a government building.

4. The computer-implemented image based method of determining and communicating a busyness metric according to claim 1, wherein step b) determines the number of people within an ROI (region of interest) associated with each of a plurality of image capturing devices and combines the determined number of people to calculate a total number of people within the area.

5. The computer-implemented image based method of determining and communicating a busyness metric according to claim 1, wherein the calculated busyness metric is compared with an upper threshold value and a lower threshold value.

6. The computer-implemented image based method of determining and communicating a busyness metric according to claim 1, wherein the calculated busyness metric is compared with one or more predefined reference busyness metric values to determine if the area is busy, normal or light.

7. The computer-implemented image based method of determining and communicating a busyness metric according to claim 1, wherein the busyness metric is communicated to the electronic device via one of email, a cellular text message, and a cellular call.

8. The computer-implemented image based method of determining and communicating a busyness metric according to claim 1, wherein the calculated busyness metric is compared to a store resource profile.

9. An image processing system comprising:
a memory and a processor in communication with the processor, the memory and processor configured to receive digital images from one or more image capturing devices directed on an area, and execute instructions to perform an image based method of determining and communicating a busyness metric associated with a number of people within the area, the method comprising:
a) acquiring video of the area from the one or more of image capturing devices;
b) calculating a representation of the number of people within the area from the acquired one or more images of the area, the representation of the number of people calculated using a regression model trained with a training set of images, the regression model configured to receive an input feature vector associated with an acquired image and output a number of distinct people associated with the input feature vector associated with the acquired image;
c) calculating the busyness metric as a function of the representation of the number of people within the area, the busyness metric related to the calculated representation of people within the area during a sequence of acquired images representative of a predetermined time period; and
d) communicating the busyness metric to one or more of an electronic device associated with a user, a data storage device and a post processing device,
wherein step b) includes:
b1) dividing each of the one or more acquired images into a plurality of windows;
b2) extracting feature vectors from each of the plurality of windows;
b3) concatenating the extracted feature vectors to form a single feature vector representation of the number of people within the area covered by the plurality of windows; and
b4) inputting the single feature vector to the regression model to determine the number of people within the area covered by the plurality of windows.

10. The image processing system according to claim 9, wherein step d) electronically notifies a person if an anomalous event has occurred, the anomalous event defined as one or more of (a) a rapid change in the number of people entering or exiting the area, and (b) the number of people within the area differing significantly from an expected number of people within the area for a time of day associated with the captured video.

11. The image processing system according to claim 9, wherein the area is associated with one of a retail store, a customer service center, an industrial building, factory, a private event, a public event, a transportation setting including an airport, a train station, a bus station, and a government building.

12. The image processing system according to claim 9, wherein step b) determines the number of people within an ROI (region of interest) associated with each of a plurality of image capturing devices and combines the determined number of people to calculate a total number of people within the area.

13. The image processing system according to claim 9, wherein the calculated busyness metric is compared with an upper threshold value and a lower threshold value.

14. The image processing system according to claim 9, wherein the calculated busyness metric is compared with one or more predefined reference busyness metric values to determine if the area is busy, normal or light.

15. The image processing system according to claim 9, wherein the busyness metric is communicated to the electronic device via one of email, a cellular text message, cellular call, and webpage.

16. The image processing system according to claim 9, wherein the calculated busyness metric is compared to a store resource profile.

17. A computer-implemented image based method of determining and communicating a busyness metric associated with a number of people within an area captured by one or more image capturing devices, the method comprising:
a) acquiring one or more images of the area from the one or more image capturing devices;
b) calculating a representation of the number of people within the area from the acquired one or more images of the area, the representation of the number of people calculated using a regression model trained with a training set of images, the regression model configured to receive an input feature vector associated with an acquired image and output a number of distinct people associated with the input feature vector associated with the acquired image;
c) calculating the busyness metric as a function of the representation of the number of people within the area, the busyness metric related to the calculated representation of people within the area during a sequence of acquired images representative of a predetermined time period; and
d) communicating the busyness metric to one or more of an electronic device associated with a user, a data storage device and a post processing device, wherein step b) comprises:

b1) performing background image subtraction on the one or more acquired images to generate one or more respective foreground images associated with the one or more acquired images;

b2) counting foreground pixels, blobs, and/or edge pixels associated with the one or more foreground images; and b3) inputting the counted foreground pixels, blobs, and/or edge pixels, represented as a feature vector, to the regression model to determine the number of people within the area.

18. An image processing system comprising:

a memory and a processor in communication with the processor, the memory and processor configured to receive digital images from one or more image capturing devices directed on an area, and execute instructions to perform an image based method of determining and communicating a busyness metric associated with a number of people within the area, the method comprising:

a) acquiring video of the area from the one or more of image capturing devices;

b) calculating a representation of the number of people within the area from the acquired one or more images of the area, the representation of the number of people calculated using a regression model trained with a training set of images, the regression model configured to receive an input feature vector associated with an acquired image and output a number of distinct people associated with the input feature vector associated with the acquired image;

c) calculating the busyness metric as a function of the representation of the number of people within the area, the busyness metric related to the calculated representation of people within the area during a sequence of acquired images representative of a predetermined time period; and d) communicating the busyness metric to one or more of an electronic device associated with a user, a data storage device and a post processing device, wherein step b) comprises:

b1) performing background image subtraction on the one or more acquired images to generate one or more respective foreground images associated with the one or more acquired images;

b2) counting foreground pixels, blobs, and/or edge pixels associated with the one or more foreground images; and b3) inputting the counted foreground pixels, blobs, and/or edge pixels, represented as a feature vector, to the regression model to determine the number of people within the area.

* * * * *